P. A. E. ARMSTRONG.
HEAT CONDUCTING DEVICE.
APPLICATION FILED MAR. 2, 1920.
1,386,303.
Patented Aug. 2, 1921.
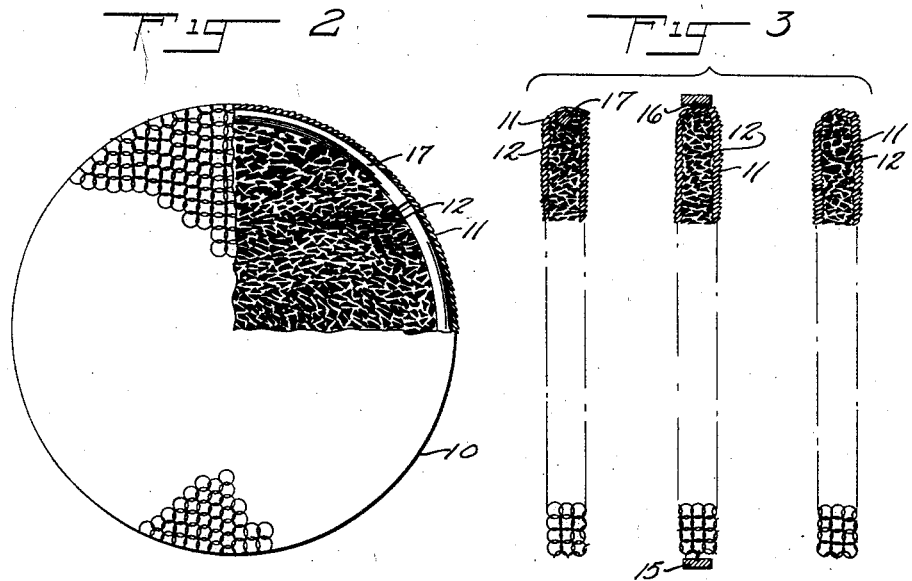
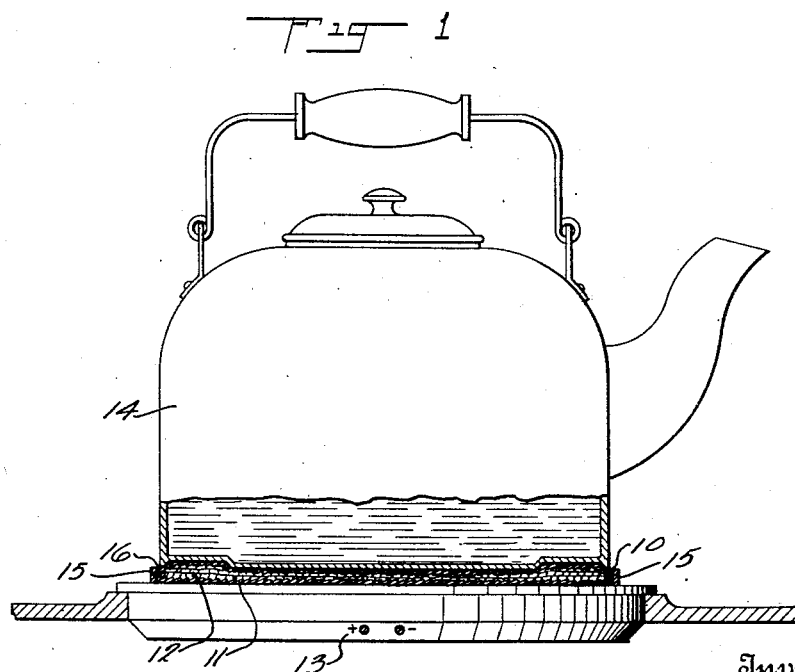
Inventor
P. A. E. Armstrong
By his Attorney H. H. Dyke

UNITED STATES PATENT OFFICE.

PERCY A. E. ARMSTRONG, OF LOUDONVILLE, NEW YORK.

HEAT-CONDUCTING DEVICE.

1,386,303.    Specification of Letters Patent.    Patented Aug. 2, 1921.

Application filed March 2, 1920. Serial No. 362,891.

*To all whom it may concern:*

Be it known that I, PERCY A. E. ARMSTRONG, a subject of the King of Great Britain, and residing at Loudonville, in the county of Albany, State of New York, have invented certain new and useful Improvements in Heat-Conducting Devices, of which the following is a specification.

My invention relates to a heat conducting device for conducting heat from a source of heat to an object to be heated by securing extensive contact between adjacent surfaces thereof.

An important field for use of the invention is in connection with electric stoves or other heating appliances of the hot plate type. The hot plates of electric stoves of this type can be economically heated electrically to a temperature of about 700 to 800 degrees F. much more efficiently and economically than radiant heat elements can be operated at substantially higher temperatures, but there is great loss in conducting the heat to cooking vessels, or other objects placed on the hot plates to be heated. This loss is due largely to the fact that it is not possible to get good mechanical contact between the hot plate and the vessel or other object to be heated, except at separated points or regions, and for the most part air spaces are left between the surfaces, which, however slight the separation of the surfaces may be, serve to practically insulate them from one another.

According to the present invention, a readily deformable heat conducting means is provided, which, being interposed between the source of heat and the object to be heated, readily conforms to and contacts with substantially the entire surfaces of both and serves as an efficient heat conducting device therebetween. The weight of the vessel resting upon such means interposed between it and the hot plate serves to bring same into close and intimate contact with all parts of the hot plate and with the lower surface of the vessel, and instead of the one being insulated from the other, substantially good mechanical contact is obtained practically throughout the surfaces and heat is rapidly and efficiently conducted.

One form in which the invention may be embodied comprises a flexible bag of metallic material, which may be formed, for example, of a wire ring mesh, and in a bag so formed are placed a quantity of small metallic pieces, which are preferably about the size of ordinary shot. A heat conducting device so constructed is very readily deformable and gives good metallic contact between the surfaces, but it will be obvious that the invention can be embodied in various other forms, so long as a flexible aggregate or package of small pieces of metal is provided for the purpose stated.

In the accompanying drawing, I have shown an embodiment such as above referred to for the purpose of affording a clear understanding of my invention, but not for limitation of the invention.

In said drawing Figure 1 is a side view, partly broken away, showing a heat conducting device in accordance with my invention interposed between an electrically heated element of the hot plate type and the bottom of a tea kettle. Fig. 2 is a plan view, partly in section, of a heat conducting device of a somewhat modified form, and Fig. 3 shows cross-sections of several forms of heat conducting devices.

The heat conducting arrangement is designated generally by reference character 10. It comprises an outer bag or inclosure 11 of flexible material, here illustrated as made up of wire-ring mesh. In the bag 11 are placed the pieces 12, which are preferably, as above stated, of metal and about the size of shot, but the size thereof may be varied considerably in practice, and they may be produced in various ways, some of which will be referred to hereafter.

When the heat conducting device is placed on a source of heat, such as the electrically heated hot plate 13, and the object to be heated, as the tea-kettle, 14, is placed thereon, the conducting device, 10, conforms closely to the surfaces both of the hot plate and the object to be heated, as is clearly shown in Fig. 1, and affords intimate mechanical contact at a very large number of close-together regions or points, thus securing effective heat conduction from the hot plate, 13, to the tea-kettle, 14. The thickness of the heat conducting device when in use, as shown, is preferably reduced to the minimum, consistent with getting good contact throughout the surface. A total thickness of about ⅜ of an inch is considered sufficient in most instances.

Means are preferably provided for holding the flexible and readily deformable heat conducting arrangement in desired forms.

The circular form is usually preferable and the means for holding same in substantially circular or disk-like form may be of various kinds. In Fig. 1 I have shown a ring, 15, which encircles the heat conducting device, 10, and is secured thereto at 16 by wiring, or in any other suitable manner. It will be seen that the ring, 15, holds the heat conducting member, 10, into substantially circular form, but that the ring, 15, is not of sufficient thickness to engage the kettle, 14, and to prevent the securing of extensive close mechanical contact between same and the hot plate, 13.

In Fig. 2 I have shown a split spring ring, 17, inserted within the bag, 11, and serving to hold same in substantially circular disk form.

The left hand portion of Fig. 3 shows a cross-sectional view of the heat conducting disk of Fig. 2, with the split ring, 17, in place therein and serving to hold same in the form of a flat circular disk. The central portion of Fig. 3 is a cross-sectional view showing the ring, 15, of Fig. 1, while the right hand portion of Fig. 3 shows a cross-section of the heat conducting device in its simplest form and without the provision of special means for holding it in shape. Still other forms may be resorted to if desired.

Various materials may be made use of for the construction of heat conducting devices in accordance with my invention. I prefer, however, to make use of stable surface alloy steel, as described in my Patent No. 1,322,511 granted November 25, 1919. Where the temperatures encountered are relatively low and do not exceed about 1000 degrees F., the mechanically worked portions of the device, such as the mesh bag, 10, and the rings, 15, 17, may be made from such stable surface alloy steel containing about 8 per cent. of chromium and about 4 per cent. of silicon, with carbon preferably below .60 per cent., and the principal part of the remainder iron; and the filling pieces, 12, may be made from the same material, but of a brittle character such that it can be readily broken up and reduced to comparatively small fragments. Such stable surface alloy steel containing about 8 per cent. of chromium, about 6 per cent. of silicon, and carbon about 1.4 per cent. affords good material for this purpose, which is quite brittle, which can be readily broken up and reduced to small sizes and which at the same time is highly resistant to oxidizing, corroding, staining and the like agents. Various other materials may be used for this purpose, however, if desired.

It will be seen that the invention affords a neat, convenient and effective means of conducting heat from a source of heat to an object to be heated and serves to bring substantially all the parts of such surfaces into substantially close and intimate mechanical contact, and that by its use energy is made use of in an economical and effective fashion.

I claim:

1. A readily deformable heat conducting device comprising an aggregate of small pieces of metal adapted to be interposed between a source of heat and an object to be heated.

2. A heat conducting device comprising a flat flexible, readily deformable package of small pieces of metal.

3. A readily deformable heat conducting device comprising a plurality of small pieces of metal and a flexible container therefor and adapted to be placed between a source of heat and an object to be heated and to conform to the variations of their surfaces and to efficiently and directly conduct heat from one to the other.

4. A flexible metallic bag and a plurality of small metallic pieces contained therein and adapted to be interposed between a source of heat and an object to be heated and to serve as an effective conductor of heat therebetween.

5. A flexible bag, a plurality of small metal pieces therein, and means for holding said bag in substantially disk form.

6. A flexible bag, a plurality of metallic bits therein, and a ring for holding said bag in substantially disk-like form.

7. A flexible, readily deformable heat conducting device for conducting heat from a source of heat to an object to be heated and formed from stable surface alloy steel containing chromium, silicon and carbon, and the principal portion of the remainder iron.

8. A flexible bag of wire rug mesh containing a quantity of small pieces of metal, and adapted to be interposed between and conform substantially close to a substantially plane source of heat and an object to be heated and to serve as an efficient conductor of heat therebetween.

In testimony that I claim the foregoing, I hereto set my hand, this 27th day of February, 1920.

PERCY A. E. ARMSTRONG.